United States Patent
Ranmuthu et al.

(10) Patent No.: US 6,724,556 B2
(45) Date of Patent: Apr. 20, 2004

(54) SINGLE POLE VOLTAGE BIAS LOOP FOR INCREASED STABILITY

(75) Inventors: Indumini W. Ranmuthu, Plano, TX (US); Hong Jiang, Santa Clara, CA (US)

(73) Assignee: Texas Instruments Incorporated, Dallas, TX (US)

(*) Notice: Subject to any disclaimer, the term of this patent is extended or adjusted under 35 U.S.C. 154(b) by 260 days.

(21) Appl. No.: 09/896,387

(22) Filed: Jun. 29, 2001

(65) Prior Publication Data

US 2003/0002192 A1 Jan. 2, 2003

(51) Int. Cl.[7] .................................................. G11B 5/03
(52) U.S. Cl. ................................. 360/66; 360/67; 360/46
(58) Field of Search .................................... 360/67, 66, 46

(56) References Cited

U.S. PATENT DOCUMENTS

| | | | | |
|---|---|---|---|---|
| 4,547,819 A | * | 10/1985 | Meitner et al. | 360/65 |
| 5,559,423 A | * | 9/1996 | Harman | 323/277 |
| 5,619,386 A | * | 4/1997 | Voorman et al. | 360/67 |
| 6,175,462 B1 | * | 1/2001 | Chung et al. | 360/67 |
| 6,252,735 B1 | * | 6/2001 | Chung et al. | 360/67 |
| 6,331,921 B1 | * | 12/2001 | Davis et al. | 360/67 |
| 6,424,480 B1 | * | 7/2002 | Bhandari et al. | 360/67 |

* cited by examiner

Primary Examiner—David Hudspeth
Assistant Examiner—Rocio Colon
(74) Attorney, Agent, or Firm—W. Daniel Swayze, Jr; W. James Brady; Frederick J. Telecky, Jr.

(57) ABSTRACT

A differential circuit to read differential data from a disk by a voltage bias includes a read circuit having a read circuit pole to read the differential data from the disk by maintaining the voltage bias and a feedback circuit having a feedback pole to sense deviations in the voltage and to adjust the voltage in response to the deviations. The read circuit pole is separated from the feedback pole in frequency.

6 Claims, 4 Drawing Sheets

SINGLE POLE VOLTAGE BIAS LOOP FOR INCREASED STABILITY

FIELD OF THE INVENTION

The present invention relates to disk circuits and, more particularly, to a method and apparatus for reading information from a magnetic disk by biasing a read head.

BACKGROUND OF THE INVENTION

Conventional magnetic storage devices include a magnetic transducer or "head" suspended in close proximity to a recording medium, for example a magnetic disk having a plurality of concentric tracks. The transducer is supported by an air-bearing slider mounted to a flexible suspension. The suspension, in turn, is attached to a positioning actuator. During normal operation, relative motion is provided between the head and the recording medium as the actuator dynamically positions the head over the desired track. The relative movement provides an airflow along the surface of the slider facing the medium, creating a lifting force. The lifting force is counterbalanced by a predetermined suspension load so that the slider is supported on a cushion of air. Airflow enters the "leading" end of the slider and exits from the trailing end. The air is used to prevent the head from contacting the disk, which would result in damage.

Writing data is typically performed by applying a current to the coil of the head so that a magnetic field is induced in the adjacent magnetic-permeable core, with the core transmitting a magnetic signal across any spacing and protecting the coating of the disk to magnetize a small portion of the digital bit of the medium within the disk.

Reading of the information in the disk is performed by sensing the change in magnetic field of the core as the transducer passes over the bits in the disk. The changing magnetic field induces a voltage or current in the inductive leak coupled coil. Alternatively, reading of the information may be accomplished by employing a magneto-resistive (MR) sensor, which has a resistance that varies as a function of the magnetic field adjacent to the sensor. In order to increase the amplitude and resolution in bits, the MR sensor is typically positioned on a slider as close to the disk as possible. Connected to these heads are sensors and read circuits which amplify the recorded data and eliminate noise.

Most differential pre-amps in use today require a constant voltage across the read head. This constant voltage is achieved by using a negative feedback loop. However, these pre-amps typically have several dominant poles, and these dominant poles are close to each other in frequency. These dominant poles can cause instability in the feedback loop, and the instability can lead to a significant overvoltage, which can destroy the MR head. Additionally, the instability can cause significant ringing of the head voltage, which will not allow the head to operate at its optimum bias voltage. Thus, there is a need for a circuit, which will eliminate these problems.

SUMMARY OF THE INVENTION

The present invention includes a constant voltage circuit, which reads information from a head and does not cause instability in the feedback loop. The present invention provides for a constant voltage circuit that moves the dominant poles apart in frequency allowing the feedback loop to operate without oscillation.

DETAILED DESCRIPTION OF THE PRESENT INVENTION

The following invention is described with reference to figures in which similar or the same numbers represent the same or similar elements. While the invention is described in terms for achieving the invention's objectives, it can be appreciated by those skilled in the art that variations may be accomplished in view of these teachings without deviation from the spirit or scope of the invention.

Figure 4:
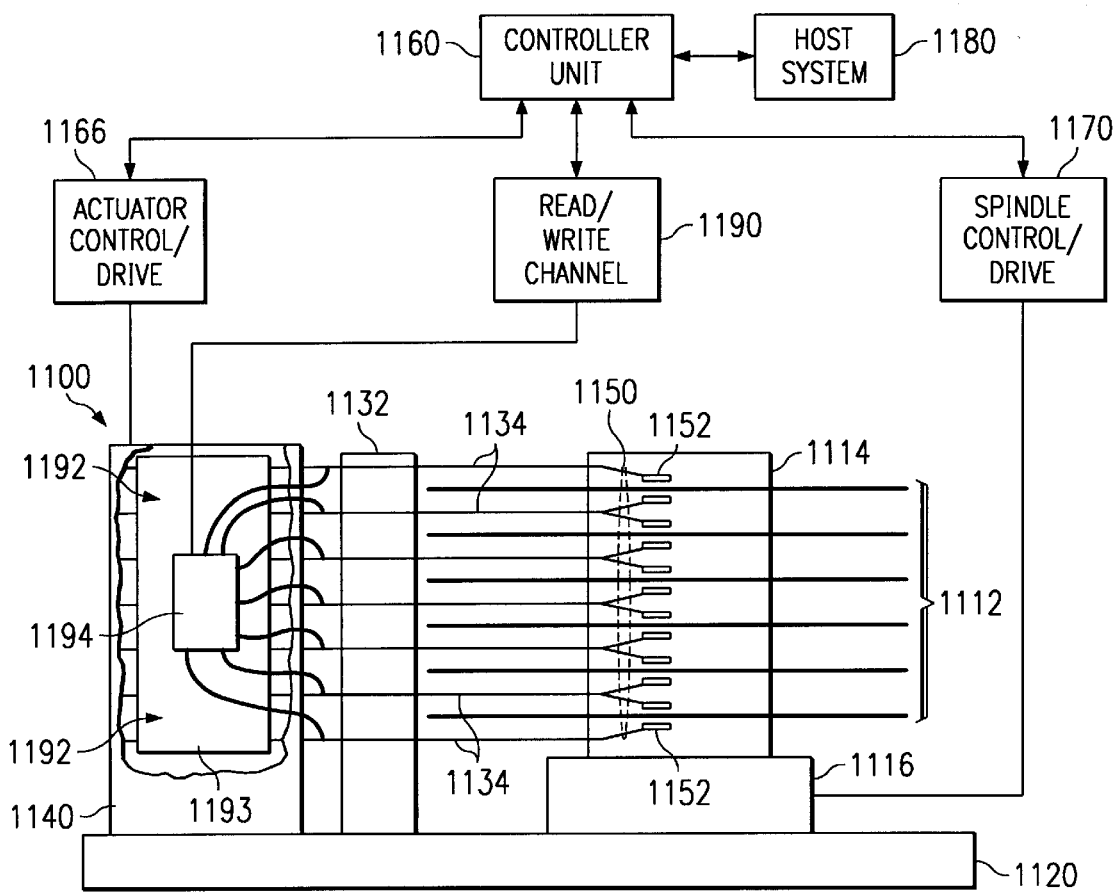
FIG. 4 illustrates a side-view of the disk drive system.
Figure 5:
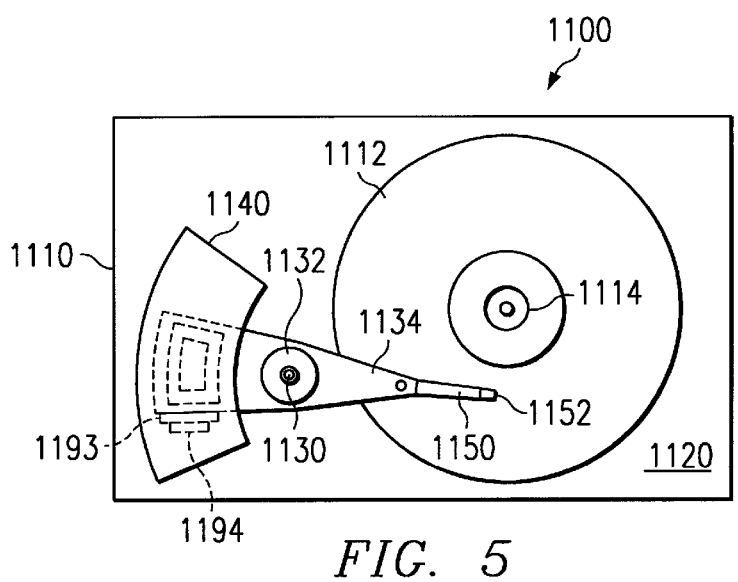
FIG. 5 illustrates the top-view of the disk drive system.

FIGS. 4 and 5 show a side and top view, respectively, of the disk drive system designated by the general reference 1100 within an enclosure 1110. The disk drive system 1100 includes a plurality of stacked magnetic recording disks 1112 mounted to a spindle 1114. The disks 1112 may be conventional particulate or thin film recording disk or, in other embodiments, they may be liquid-bearing disks. The spindle 1114 is attached to a spindle motor 1116, which rotates the spindle 1114 and disks 1112. A chassis 1120 is connected to the enclosure 1110, providing stable mechanical support for the disk drive system. The spindle motor 1116 and the actuator shaft 1130 are attached to the chassis 1120. A hub assembly 1132 rotates about the actuator shaft 1130 and supports a plurality of actuator arms 1134. The stack of actuator arms 1134 is sometimes referred to as a "comb." A rotary voice coil motor 1140 is attached to chassis 120 and to a rear portion of the actuator arms 1134.

A plurality of head suspension assemblies 1150 are attached to the actuator arms 1134. A plurality of inductive transducer heads 1152 are attached respectively to the suspension assemblies 1150, each head 1152 including at least one inductive write element. In addition thereto, each head 1152 may also include an inductive read element or a MR (magneto-resistive) read element. The heads 1152 are positioned proximate to the disks 1112 by the suspension assemblies 1150 so that during operation, the heads are in electromagnetic communication with the disks 1112. The rotary voice coil motor 1140 rotates the actuator arms 1134 about the actuator shaft 1130 in order to move the head suspension assemblies 1150 to the desired radial position on disks 1112.

A controller unit 1160 provides overall control to the disk drive system 1100, including rotation control of the disks 1112 and position control of the heads 1152. The controller unit 1160 typically includes (not shown) a central processing unit (CPU), a memory unit and other digital circuitry, although it should be apparent that these aspects could also be enabled as hardware logic by one skilled in the computer arts. Controller unit 1160 is connected to the actuator control/drive unit 1166, which is in turn connected to the rotary voice coil motor 1140. A host system 1180, typically a computer system or personal computer (PC), is connected to the controller unit 1160. The host system 1180 may send digital data to the controller unit 1160 to be stored on the disks, or it may request that digital data at a specified location be read from the disks 1112 and sent back to the host system 1180. A read/write channel 1190 is coupled to receive and condition read and write signals generated by the controller unit 1160 and communicate them to an arm electronics (AE) unit shown generally at 1192 through a cut-away portion of the voice coil motor 1140. The AE unit 1192 includes a printed circuit board 1193, or a flexible carrier, mounted on the actuator arms 1134 or in close proximity thereto, and an AE module 1194 mounted on the printed circuit board 1193 or carrier that comprises circuitry preferably implemented in an integrated circuit (IC) chip including read drivers, write drivers, and associated control circuitry. The AE module 1194 is coupled via connections in the printed circuit board to the read/write channel 1190 and also to each read head and each write head in the plurality of heads 1152. The AE module 1194 includes the constant voltage circuit 100 of the present invention.

Figure 1:
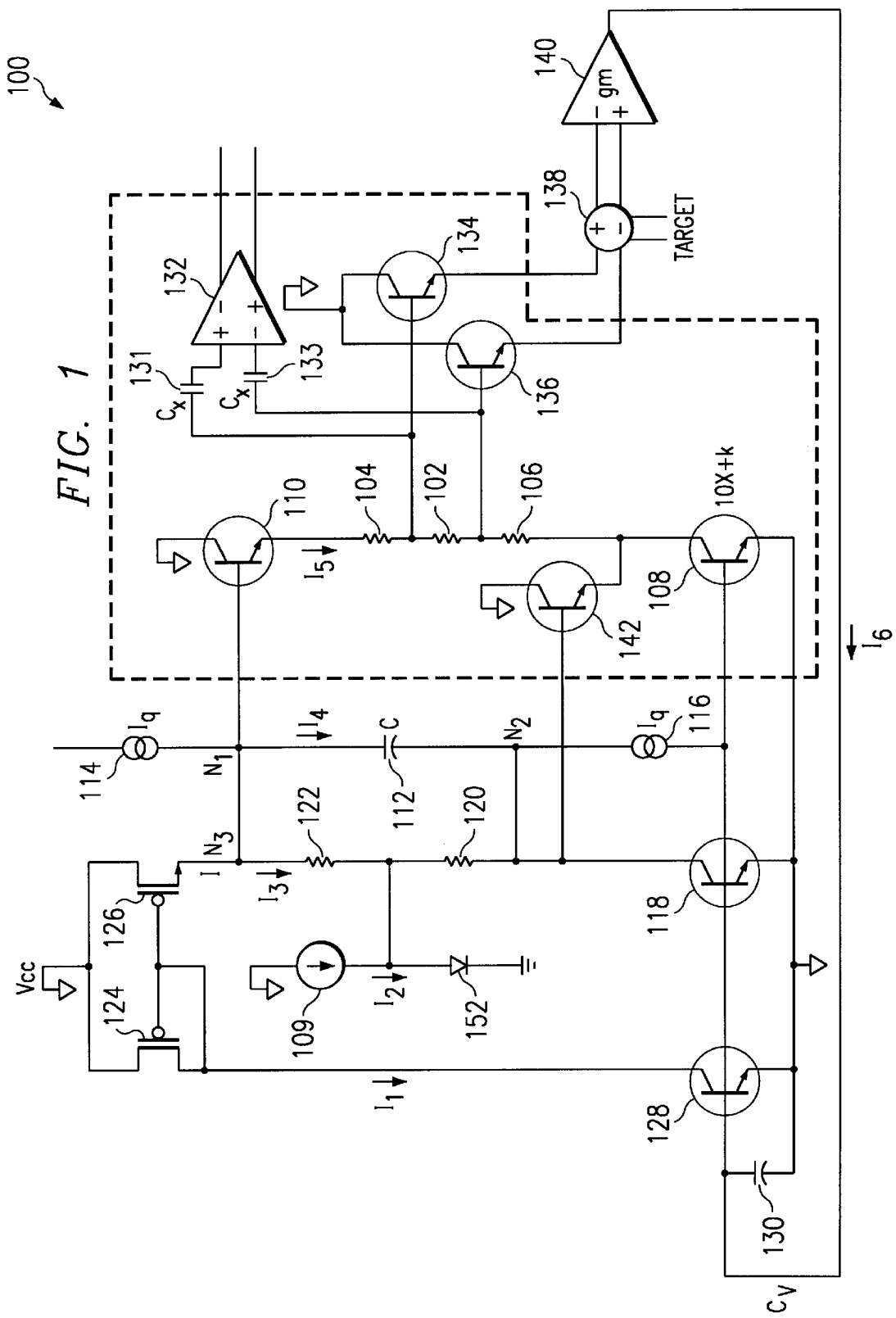
FIG. 1 illustrates a constant voltage circuit in accordance with the teachings of the present invention.

Turning now to FIG. 1, FIG. 1 illustrates six current paths of the constant voltage circuit 100.

The first current path conducts current $I_1$ through PFET 124 and NPN transistor 128. The source of PFET 124 is connected to voltage $V_{CC}$. The gate of PFET 124 is connected to the drain of PFET 124. Additionally, the drain of PFET 124 is connected to the collector of transistor 128. The base of transistor 128 is connected to capacitor 130 and to transconductance device 140. The emitter of transistor 128 is connected to, for example, a ground voltage. PFET 124 and PFET 126 form a current mirror, and transistor 128, transistor 118 and transistor 108 form an additional current mirror.

A second current path conducting current I2 includes a current source 101, which is connected at one end to voltage Vcc and the other end to diode 152. The current source 101 and diode 152 are used to form a voltage to ground at anode of diode 152 to keep the common mode voltage of the head at ground. This voltage is the common-mode voltage of nodes N1 and N2. Current I2 is chosen to let this voltage drop across diode 152 be the same as base-to-emitter voltage drop of transistors 110 and 142. This arrangement makes the electrical potential of the center point of ladder of resistors 104, 102 and 106 equal to the cathode potential of diode 152, meaning that MR head is DC biased with its center point being always at the same potential as ground.

The third current path is used to conduct current $I_3$. Current $I_3$ is a current mirrored by the current mirror 124 and circuit represented by PFET 126. The magnitude of current $I_3$ is related to the magnitude of current $I_1$. The third current path includes PFET 126, resistor 122, resistor 120 and NPN transistor 118. The source of PFET 126 is connected to voltage $V_{CC}$. The drain of PFET 126 is connected to one end of resistor 122. The other end of resistor 122 is connected to current source 101 and to diode 102 and produced a voltage as a result of the current flow. The resistor 120 is connected to the other of resistor 122 and produces a voltage as a result of the current flow. The other end of resistor 120 is connected to NPN transistor 118. The collector of transistor 118 is connected to the other end of resistor 120. The emitter of transistor 118 is connected to ground, and the base of transistor 118 is connected to the base of transistor 128. The resistors 122 and 120 form a voltage based on the current $I_3$ times the resistance of resistor 122 and $I_3$ times the resistance of resistor 120. These voltages are used to form a voltage at terminals $N_1$ and $N_2$. The voltage at $N_1$ is the voltage at the emitter of transistor 110 minus $V_{BE}$. The voltage at the emitter of transistor 142 is the voltage at terminal $N_2$ minus $V_{BE}$. Likewise, the voltage at $N_2$ is the voltage across resistor at the base of transistor 142. The capacitor 112 is connected to one of resistor 122 and the other end of capacitor 112 is connected to the other end of transistor 120.

The fourth current path conducts current $I_4$. The fourth current path includes current source 114, capacitor 112 and current source 116. The current source 114 and the current source 116 allow the capacitor 112 to be quickly charged once the capacitor 112 has been discharged.

The fifth current path is to conduct the current $I_5$. The fifth current path includes transistor 108, transistor 110, resistor 102 which is the resistance associated with the MR head shown as head 1152, resistor 104 and resistor 106. The base of transistor 110 is connected to terminal $N_1$ and the collector of transistor 110 is connected to voltage $V_{CC}$. The emitter of transistor 110 is connected to resistor 104. The other end of resistor 104 is connected to resistor 102. The resistor 102 is an indication of the MR head. The other end of resistor 102 or the MR head is connected to transistor 106. The other end of resistor 106 is connected to the emitter of transistor 142. The collector of transistor 142 is connected to voltage $V_{CC}$. The other end of resistor 106 is connected to the collector of transistor 108. The base of transistor 108 is connected to the base of transistor 118, and the emitter of transistor 108 is connected to ground. The resistor 104 and resistor 106 provide a constant voltage to MR head shown as resistor 102. As discussed before, the voltage at terminal $N_1$ minus $V_{BE}$ is the voltage at the emitter of transistor 111, and the voltage at terminal $N_2$ is minus $V_{BE}$ is the voltage at the other end of resistor 106. Resistors 104 and 106 are approximately the same voltage in this embodiment in order to provide the same voltage across the MR head or resistor 102.

The plus input of differential amplifier 132 is connected to capacitor 131. The other end of capacitor 131 is connected through capacitor 131 to the terminal between resistor 104 and resistor 102 shown as MR head. The capacitor 133 has one end connected to the other end of resistor 102 and one end of resistor 106. The other end of capacitor 133 is connected to the negative input of differential amplifier 132.

The sixth current shown as carrying the current $I_6$ is the feedback path from the output of transconductance element 140 to capacitor 130. The other end of capacitor 130 is connected to ground. As this current is increased, the voltage across capacitor 130 increases increasing the voltage to the base of transistors 128, 118 and 106, respectively. This increases the current in the first current path, the third current path and the fifth current path, and, correspondingly, increases the voltage across the element MR head shown as resistor 102. Correspondingly, lowering the current $I_6$ lowers the voltage across the MR head shown as resistor 102.

The feedback circuit is illustrated. The feedback circuit includes N-P-N transistor 136, N-P-N transistor 134, subtraction circuit 138, transconductance circuit 140 and capacitor 130. The transistor 134 has a base connected to one end of the MR head shown as resistor 102, and transistor 136 has a base connected to the other end of the MR head shown has resistor 102. The voltage of the emitter of transistor 134 is the voltage at one end of the MR head 102 minus the voltage $V_{BE}$. Likewise, the voltage at the emitter of transistor 136 is the voltage at the other end of the MR head 102 minus the voltage $V_{BE}$. The collector of transistors 134 and 136 are connected to voltage $V_{CC}$ and are connected together. Additionally, the emitter collector of transistor 134 is connected to the plus input of subtractor 138 to input the voltage between resistor 104 and resistor 102 to subtractor 138. The emitter of transistor 136 is connected to the minus input of subtractor 138 to input the voltage between resistor 102 and resistor 106 to subtractor 138. Additionally, a target voltage, which is the target voltage for the MR head shown as resistor 102 is input to the subtractor 138. The subtractor 138 subtracts the target voltage from the emitter voltage of transistor 136 to generate a reduced voltage. This reduced voltage is output to be input to the plus terminal of transconductance element 140. The voltage from the emitter of transistor 134 is input to the negative input [through the subtractor 138] of transconductance element 140. The voltage difference between the emitter of transistor and the reduced voltage input to transconductance circuit 140 is output from the transconductance circuit 140 in the form of current $I_6$. As the difference between the voltages input to the transconductance circuit 140 becomes smaller, the current $I_6$ becomes smaller and, corresponding, if the different voltage to the inputs of the transconductance circuit 136 becomes larger, the current output becomes larger. As discussed before, as $I_6$ becomes larger, the voltage in capacitor 130 becomes larger. The increased voltage increases the voltage from base to emitter of transistor 108, 118, and 128 allowing more current to flow. This increases the voltage across the MR head as shown as resistor 102.

As illustrated in the constant voltage circuit 100, there are at least two poles. One pole is a result of the transconductance element 140 and the capacitor 130 to form a feedback pole and another pole is a result of capacitor 112 and resistors 122 and 120 to form a read circuit pole. It is important that these two poles be kept apart as far as possible in frequency. Thus, the capacitor 112 is reduced by an order of four times. For example, the capacitance of capacitor 112 is reduced from 800 pf to 400 pf or could even be reduced to 200 pf. Reducing the capacitance in this way removes the two poles from close proximity in frequency and, correspondingly, the circuit 100 does not ring, and when the ring is prevented, the MR head shown as resistor 102 has significant improvement in the way of the voltage. Thus, since the voltage does not move significantly, the MR head does not burn out due to the stress caused by the overvoltage of ringing. Additionally, reducing the size of capacitor 112 does not affect the behavior of the circuit, and, as discussed, a quick charging circuit has been added consisting of current source 114 and current source 116 to quickly charge the capacitor 112.

Figure 2:
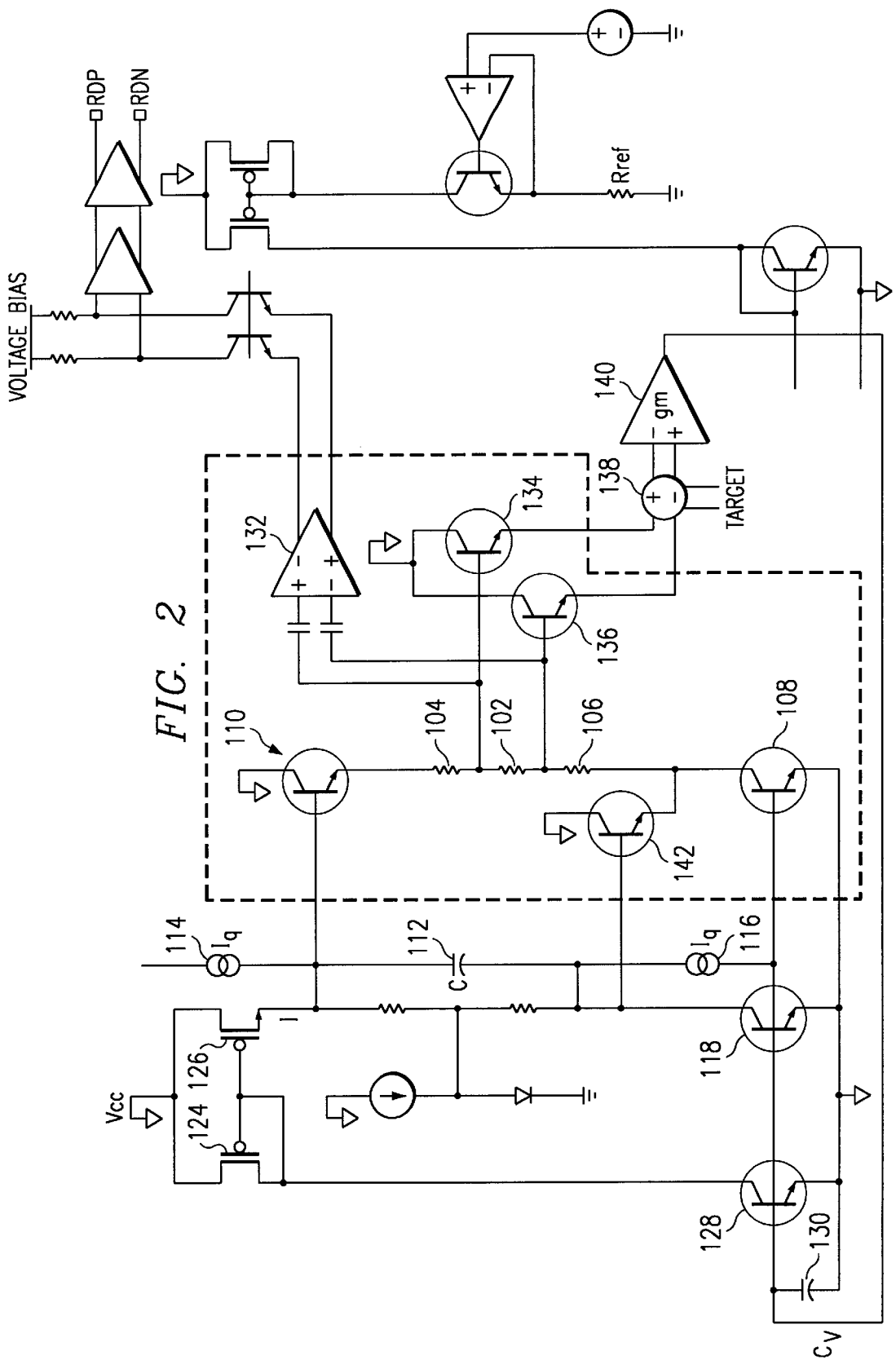
FIG. 2 illustrates a pre-amplifier using the constant voltage circuit.

FIG. 2 illustrates the pre-amp circuit including the constant voltage circuit 100.

Figure 3:
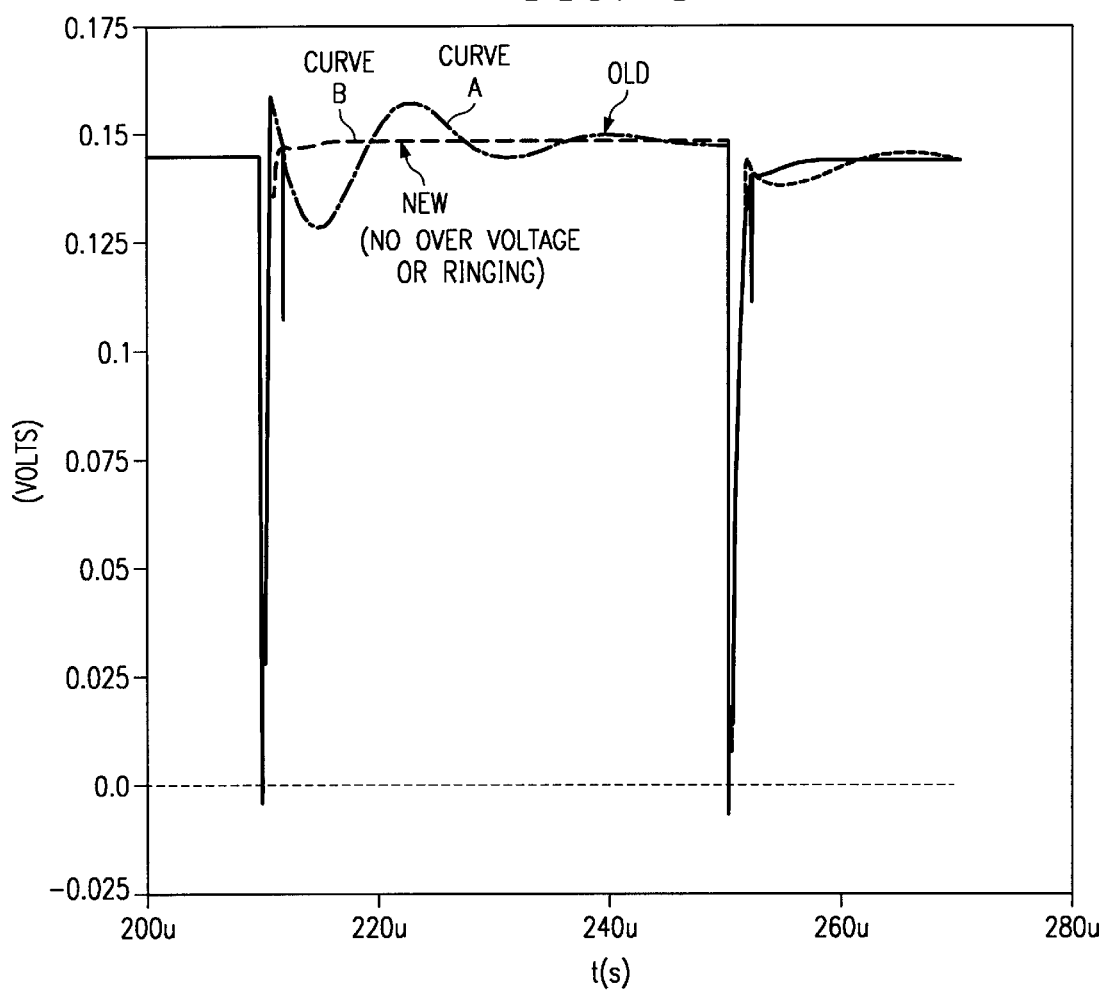
FIG. 3 illustrates waveforms showing at least some of the improvements of the present invention.

Turning now to FIG. 3, curve A shows the circuit of the prior art with ring caused by the poles being close together. In contrast, curve B shows the response of constant voltage circuit 100 with no ring.

What is claimed is:

1. A differential circuit to read differential data from a disk by a voltage bias on a read head, comprising:
   a read circuit having a read circuit pole to read said differential data from said disk by maintaining said voltage bias on said read head; and
   a feedback circuit having a feedback pole to sense deviations in said voltage and to adjust said voltage in response to said deviations,
   wherein said read circuit pole and said feedback pole are separated in frequency.

2. A differential circuit, as in claim 1, wherein said read circuit pole includes a capacitor with a capacitance of 400 pf.

3. A differential circuit, as in claim 1, wherein said read circuit pole includes a capacitor with a capacitance of 200 pf.

4. A disk system to read information from a disk, comprising:
   a read/write head to read and write information from said disk;
   a read channel to process said information; and
   a differential circuit to read differential data from a disk by a voltage bias, comprising:
      a read circuit having a read circuit pole to read said differential data from said disk by maintaining said voltage; and
      a feedback circuit having a feedback pole to sense deviations in said voltage and to adjust said voltage in response to said deviations,
      wherein said read circuit pole and said feedback pole are separated in frequency.

5. A disk system, as in claim 4, wherein said read circuit pole includes a capacitor with a capacitance of 400 pf.

6. A disk system, as in claim 5, wherein said read circuit pole includes a capacitor with a capacitance of 200 pf.

* * * * *